Jan. 22, 1929.

C. S. COLE 1,700,026

SPARK PLUG TESTER

Filed March 22, 1927

WITNESSES

INVENTOR
C. S. Cole.
BY
ATTORNEY

Patented Jan. 22, 1929.

1,700,026

UNITED STATES PATENT OFFICE.

CARMAN S. COLE, OF PENDLETON, OREGON.

SPARK-PLUG TESTER.

Application filed March 22, 1927. Serial No. 177,387.

My invention relates to a testing device for spark plugs and has for its general object to provide a spark plug tester which may be employed to test the spark under substantially the same degree of compression as it will be subjected to in practice, whereby the tester will indicate defects of the spark plug which ordinarily will not show up or be indicated when the plug is tried out or tested when not under compression.

The nature of my invention and its distinguishing features and advantages will more clearly appear as the description proceeds.

Reference is to be had to the accompanying drawings forming a part of this specification, it being understood that the drawings are merely illustrative of one example of the invention.

Figure 1:
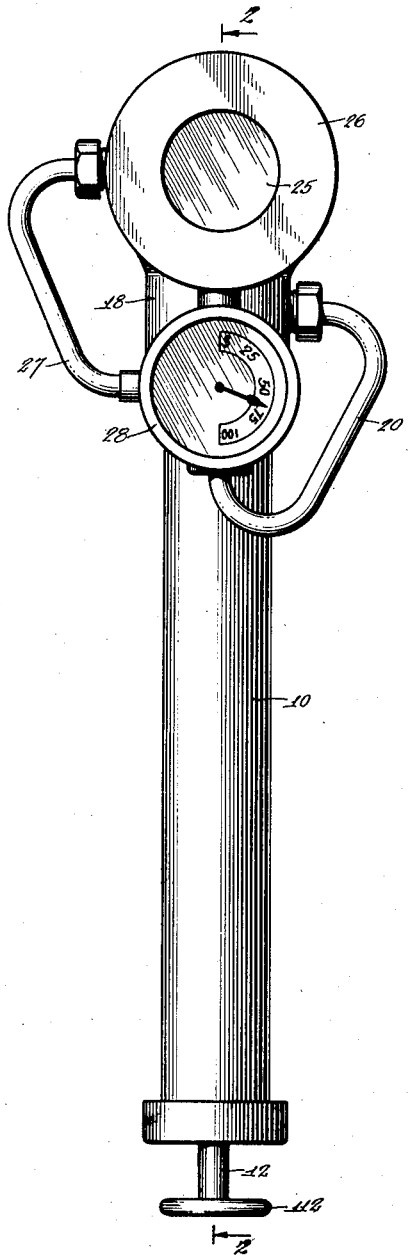
Figure 1 is a front elevation of a spark plug tester embodying my invention.
Figure 2:
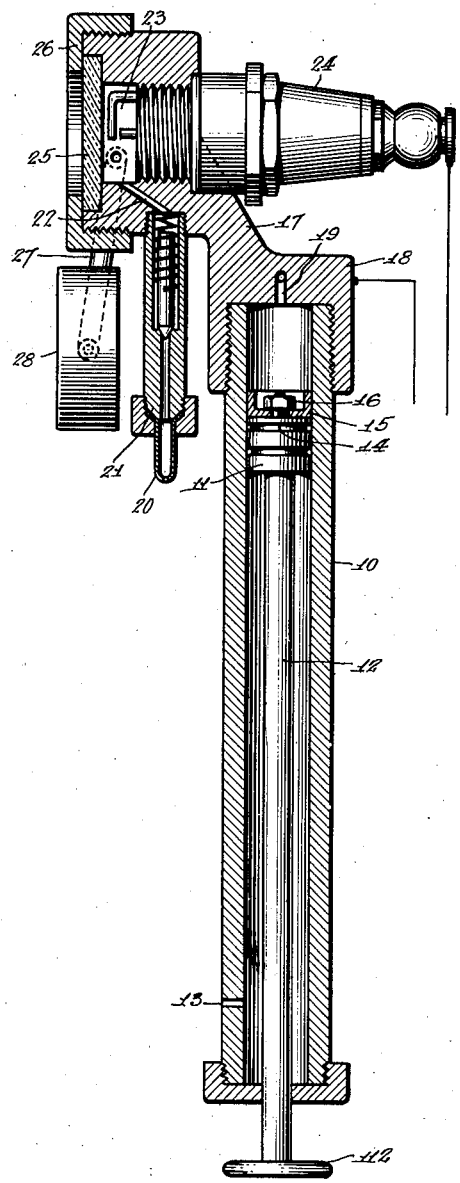
Figure 2 is a vertical section in a plane indicated by the line and arrows 2—2 in Figure 1.

In carrying out my invention in accordance with the illustrated example a pump cylinder 10 is provided in which operates a plunger 11, the rod 12 of which has a suitable handle 112 for operating the plunger. The numeral 13 indicates the air inlet of the pump. The plunger 11 has a seat 14 at the top for the cup leather 15 held by nut 16.

On the pump cylinder 10 is mounted a head 17 having integral therewith a cap 18 which is threaded on to and forms a closure at the forward end of said cylinder. Said cap 18 has a discharge port 19 leading from in front of the plunger 11.

A pipe 20 connects the discharge port 19 of the pump with one end of a check valve 21, the valve in the illustrated form consisting of a known construction. From the valve 21 a port 22 leads to a chamber 23 formed in the head 17, said chamber at one side being closed by the spark plug 24 screwed thereon when the plug is to be tested. The chamber 23 at the front has a sight opening which in practice is provided with a lens 25 held in place by a screw cap 26. The chamber 23 in practice connects by a pipe 27 with a pressure gage 28.

From the description and illustration of the assemblage it will be seen that air from the discharge port 19 of the pump will pass by pipe 20 to the valve 21 and from said valve by passage 22 to the chamber 23, the pressure in said chamber 23 registering at the gage 28 by reason of the connecting pipe 27. This pressure may be developed at the terminals of the spark plug in accordance with the pressure under which the plug is used in practice and the functioning of the plug may be observed through the lens 25. Thus the plug will be caused to be tested as to its efficiency and operativeness under substantially the same condition of pressure under which the plug will be employed when in actual use.

In the use of the described tester the spark plug is first screwed into the head 17 and then the high tension lead from the booster magneto is connected to the spark plug as well as a ground lead from the tester to the base of the booster magneto. Then the pump, which it will be observed, is contained in the handle of the tester, is given a few strokes to build up pressure in the chamber 23. Then the booster crank is given a few turns and the firing of the spark plug is observed through the lens 25. Thus the spark will be tested under pressure conditions approximately the same as those under which the spark plug operates in actual practice.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claims.

What I claim is:

1. A spark plug tester in the form of a compact tool comprising a pump barrel constituting an elongated handle, a piston operating in the barrel, a head projecting from one end of the handle, the head having oppositely disposed flat faces and openings in said faces, one of the openings having a transparent closure, the other opening being adapted to receive a spark plug with the electrodes visible through the transparent closure, the head being provided with a chamber in communication with the opening and in communication with the pump barrel.

2. A spark plug tester in the form of a compound tool comprising a pump barrel constituting an elongated handle, a piston operating in the barrel, a head projecting from one end of the handle and provided with a chamber, a conduit for placing the chamber in restricted communication with the pump barrel so that when the piston is operated air pressure will be produced within the chamber, which pressure will simulate the pressure under which a spark must operate in the combustion chamber of an internal combustion engine, and a valve intercalated in the conduit for maintaining such pressure in the chamber, the head having a threaded opening to receive a spark plug, the head having a second opening opposite the threaded opening and provided with a transparent closure.

CARMAN S. COLE.